United States Patent
Cote et al.

(10) Patent No.: US 10,217,039 B2
(45) Date of Patent: Feb. 26, 2019

(54) VISUAL RFID TAGS AND INTERACTIVE VISUAL RFID NETWORKS

(75) Inventors: Andre Cote, Williamstown, IL (US); Edmund S. Nabrotzky, Waterloo (CA)

(73) Assignee: OMNI-ID CAYMAN LIMITED, Grand Cayman (KY)

( * ) Notice: Subject to any disclaimer, the term of this patent is extended or adjusted under 35 U.S.C. 154(b) by 0 days.

(21) Appl. No.: 13/528,381

(22) Filed: Jun. 20, 2012

(65) Prior Publication Data

US 2012/0287095 A1 Nov. 15, 2012

Related U.S. Application Data

(63) Continuation of application No. 13/468,759, filed on May 10, 2012.

(60) Provisional application No. 61/484,649, filed on May 10, 2011, provisional application No. 61/616,389, filed on Mar. 27, 2012.

(51) Int. Cl.
*G06K 19/077* (2006.01)
*G06K 19/07* (2006.01)
*G06Q 10/08* (2012.01)

(52) U.S. Cl.
CPC ... *G06K 19/07707* (2013.01); *G06K 19/0702* (2013.01); *G06Q 10/08* (2013.01)

(58) Field of Classification Search
CPC .................. G06K 19/0723; G06K 7/0008
USPC ...................................... 340/572.1
See application file for complete search history.

(56) References Cited

U.S. PATENT DOCUMENTS

| | | | |
|---|---|---|---|
| 5,537,105 A | 7/1996 | Marsh et al. | |
| 5,887,176 A * | 3/1999 | Griffith | G06K 7/10019 340/10.33 |
| 6,512,478 B1 | 1/2003 | Chien | |
| 6,903,656 B1 | 6/2005 | Lee | |
| 7,253,717 B2 | 8/2007 | Armstrong et al. | |
| 7,633,392 B2 | 12/2009 | Neuwirth | |
| 7,756,467 B2 * | 7/2010 | Bent et al. | 455/3.04 |
| 7,791,489 B2 | 9/2010 | Gelbman et al. | |
| 7,830,259 B2 | 11/2010 | Walker et al. | |
| 7,978,050 B2 * | 7/2011 | Moshfeghi | 340/10.2 |
| 2002/0057208 A1 | 5/2002 | Lin et al. | |
| 2002/0196146 A1 | 12/2002 | Moore | |
| 2004/0024644 A1 | 2/2004 | Gui et al. | |
| 2005/0242188 A1 | 11/2005 | Vesuna | |
| 2006/0170565 A1 * | 8/2006 | Husak et al. | 340/825.49 |
| 2006/0208899 A1 | 9/2006 | Suzuki et al. | |
| 2006/0277104 A1 | 12/2006 | Overhultz et al. | |

(Continued)

FOREIGN PATENT DOCUMENTS

EP 1462821 9/2004
EP 1762971 3/2007

*Primary Examiner* — Mohamed Barakat
(74) *Attorney, Agent, or Firm* — McDonnell Boehnen Hulbert & Berghoff LLP

(57) ABSTRACT

RFID driven display system components such as wireless displays (visual RFID tags) and multi-antenna wireless RFID readers that monitor/control the RFID driven displays in order to provide visual real-time information to display viewers and/or provide useful information to a central processing station that monitors the status of and/or updates the RFID driven displays, networks including one or more of the components, and methods for using the RFID driven display system components to monitor assets in applications such as inventory control and manufacturing.

13 Claims, 8 Drawing Sheets

(56) References Cited

U.S. PATENT DOCUMENTS

| | | |
|---|---|---|
| 2007/0035400 A1* | 2/2007 | Lauper ..................... 340/572.1 |
| 2007/0090953 A1 | 4/2007 | Park et al. |
| 2007/0200712 A1 | 8/2007 | Arneson et al. |
| 2007/0205894 A1 | 9/2007 | Nelson et al. |
| 2007/0240068 A1 | 10/2007 | Shah et al. |
| 2007/0288995 A1* | 12/2007 | Terada .................. H04L 63/107 |
| | | 726/2 |
| 2009/0040048 A1 | 2/2009 | Locker et al. |
| 2009/0079565 A1 | 3/2009 | Mackenzie et al. |
| 2009/0111484 A1 | 4/2009 | Koch et al. |
| 2009/0207025 A1* | 8/2009 | Rofougaran et al. ...... 340/572.1 |
| 2010/0205000 A1* | 8/2010 | Cho ................... 705/2 |
| 2011/0057770 A1 | 3/2011 | Tsudik et al. |
| 2011/0291814 A1* | 12/2011 | Faith .................... G01S 5/0226 |
| | | 340/10.5 |
| 2012/0286937 A1 | 11/2012 | Cote |
| 2012/0286938 A1 | 11/2012 | Cote |
| 2012/0286939 A1 | 11/2012 | Cote |

* cited by examiner

VISUAL RFID TAGS AND INTERACTIVE VISUAL RFID NETWORKS

This application is a continuation of application Ser. No. 13/468,759, filed on May 10, 2012 which in turn claims the benefit of the filing dates of provisional patent application Ser. No. 61/484,649 filed on May 10, 2011 and provisional patent application Ser. No. 61/616,389 filed on Mar. 27, 2012 the specifications of each of which are incorporated by reference herein in their entirety.

BACKGROUND OF THE INVENTION (1) Field of the Invention

This invention concerns RFID driven display system networks, network components, and methods for using the RFID driven display networks and components to track assets in various applications such as manufacturing, logistical and retail environments. The RFID driven display networks include components such as wireless displays (visual RFID tags), multi-antenna wireless RFID readers, central control stations, wireless hubs and so forth that operate together to provide and update visual information displayed on dynamic displays so as to provide useful information to a central processing station monitoring assets associated with one or more RFID and/or to provide useful information to persons viewing information on the displays.

(2) Description of the Related Art

Radio frequency identification tags (RFID tags) have many different practical applications. The applications for RFID tags continue to grow as the tag size decreases and as the tag versatility and read ranges increase. However, there are still constraints that prevent the use of RFID tags in particular applications or that make their use prohibitively expensive.

One area where RFID tag use can be prohibitively expensive is in the monitoring of moving assets such as carts, dollies and so forth in manufacturing or logistic applications. Using RFID tags on moving assets typically requires the use of many RFID tag readers, antennas, communication hubs and so forth many to all of which have to be hard wired to a power source and possibility to one another. Moreover, the interrogation and read range of RFID tag readers are somewhat limited and, therefore many readers must be installed to cover all areas where RFID tags might be placed in in typical manufacturing or logistical applications.

Another application where RFID tags are not commonly used or where their use can be prohibitively expensive is in applications where displays are used that are driven by RFID tag interrogation data such as retail store shelves where products located on shelves are tagged with an RFID tag. Such an application requires a great many readers and displays all of which typically need to be hard wired to a power source and potentially to each other and/or to a central control station. The need for many RFID tag readers and the need to have the network components to a power source can make such systems too expensive to install in retail applications. There is a need, therefore, for new RFID network solutions and new network components that make RFID driven display networks cheaper to install and/or more versatile and/or that can provide real-time visual feedback to a user or retail customer based upon collected RFID tag interrogation data.

SUMMARY OF THE INVENTION

A first aspect of this invention is a dynamic visual RFID tag. The dynamic visual RFID tag includes a display, an RFID tag, a communications module, a display microcontroller; and an internal energy source wherein the communications module communicates display update instructions to the display microcontroller.

Another aspect of this invention is a dynamic visual RFID tag comprising a low power persistent display for displaying visual information; a communications module for receiving wireless communications, the communications module including a unique identifier; a passive RFID tag including a chip and an antenna, the RFID tag including a unique identifier; a low power microcontroller that complies and directs provides the digital information for the visible persistent display to display as visual information; and an internal power source.

Still another aspect of this invention is a method for displaying information on a dynamic visual RFID tag. The method includes providing a visual RFID tag including a display, an RFID tag, a communications module, a display microcontroller; and an internal energy source wherein the communications module communicates with the display microcontroller wherein the display is not hard wired to an energy source; providing information to display on the display; and displaying the provided information on the display in response to a display prompt.

Another aspect of this invention are edge readers comprising an RFID tag reader including an antenna, a wireless communications device, a microcontroller and a power source where the power source is preferably an internal power source such as a battery.

A further aspect of this invention are edge reader networks comprising one or more edge readers of this invention along with at least on base station reader the base station reader further comprising an RFID tag reader having an antenna, a first wireless communications device for communicating wirelessly with the one or more edge readers and a second communications device for communicating with a central control station.

Yet another aspect of this invention is a retail network comprising: a central control station; one or more edge readers, each edge reader further comprising an RFID tag reader including an antenna, a wireless communications device, a microcontroller; and a power source; at least one base station reader the base station reader further comprising an RFID tag reader having an antenna, a first wireless communications device for communicating wirelessly with the one or more edge controllers and a second communications device; and a plurality of items which are individually tagged with RFID tag wherein at least a portion of the RFID tagged items lie outside of the read range of the base station RFID tag reader but within the read range of one or more edge reader RFID tag reader. The retail network may further include a plurality of visual displays, each visual display including a display, a communications module and a display microcontroller wherein the communication module of each visible display receives display instructions from the central control system.

Still another aspect of this invention is a mesh communications network comprising: a plurality of moving assets, each moving asset associated with a visual RFID tag, each visual RFID tag including an display, an RFID tag having RFID tag information, a communications module, a display microcontroller and an internal energy source, the visual display being capable of displaying information related to the moving asset to which the visual display is associated; a plurality of spaced readers, each reader including a plurality of mesh antennas for collecting RFID tag information and a communications device; and a central control station for receiving RFID tag information from the reader communication device. In this aspect, the central control station and readers operate cooperatively to identify the location of visual RFID tags associated with each of a plurality of moving assets. When the location of a moving asset is known, the central control station can determine whether or not to send instructions to the visual RFID tag associated with moving asset to alter the information displayed on the tag display based upon the location of the moving asset.

An further aspect of this invention is A mesh communications network comprising: one or more readers each reader including an RFID tag reader; a plurality of spaced antennas and a communication device; a central control station; and one or more visible RFID tags each associated with a moving asset wherein the location of the moving asset is identified as the location of a first antenna associated with the one or more RFID tag readers that is in the read range of unique identifying information about the visible RFID tag associated with the moving asset.

DESCRIPTION OF THE FIGURES

Aspects of the present inventions will now be described, by way of example, with reference to the accompanying Figures in which.

DESCRIPTION OF CURRENT EMBODIMENTS

This invention concerns RFID driven display networks. This invention further includes specialized and novel equipment used in the RFID driven display networks. The RFID driven display networks will generally use RFID technology to relay information about an asset associated with an RFID tag to a control station that in turn can prompt the control station to issue a response such as sending instructions to a visible display associated with an RFID tag to take some action such as to activate a display or alter information displayed on a visible display associated with the RFID tag. The networks of this invention are highly complex in that they will typically include a multitude of RFID tagged assets and associated visible displays, the RFID tags of which are simultaneously monitored and which displays are controlled simultaneously by one or more control stations. The networks of this invention will include one or more pieces of equipment or systems that will be discussed in more detail below. The systems and equipment include displays, RFID tag readers, trigger emitters, edge readers, wireless or wired communication hubs and central control stations.

A first device that is used in the networks of this invention is a display. The RFID display networks that are discussed herein all can employ displays. Unless stated otherwise, the displays can be any type of displays that are useful in an RFID based network. A display can be battery powered, it can be hard wired to a power source or it can be a self-powered display. Preferably, the displays used in the RFID networks of this invention will be low power displays that are either battery powered or that are self-powered in a manner that will be described below. More preferably, the displays are persistent displays such as low power LCD display, thin film ink displays, e-paper displays and segmented versions thereof. In another embodiment, the display can be made of bi-stable plastics or other material to create a color change. The signal stays persistent without power until it is changed again through an RF signal which provides the energy and the command to change the flag. For example, the display can be associated with a moving asset such as a cart of parts used in a manufacturing process and the color on the display can be changed from green to yellow and then to red as an indicator of the time the goods have been sitting in the cart unused. Moreover, the display can display information either in a pixelated form using, for example, letters or numbers or a change of color or of color hue or by any other method that can convey information to a person viewing the display.

Figure 1:
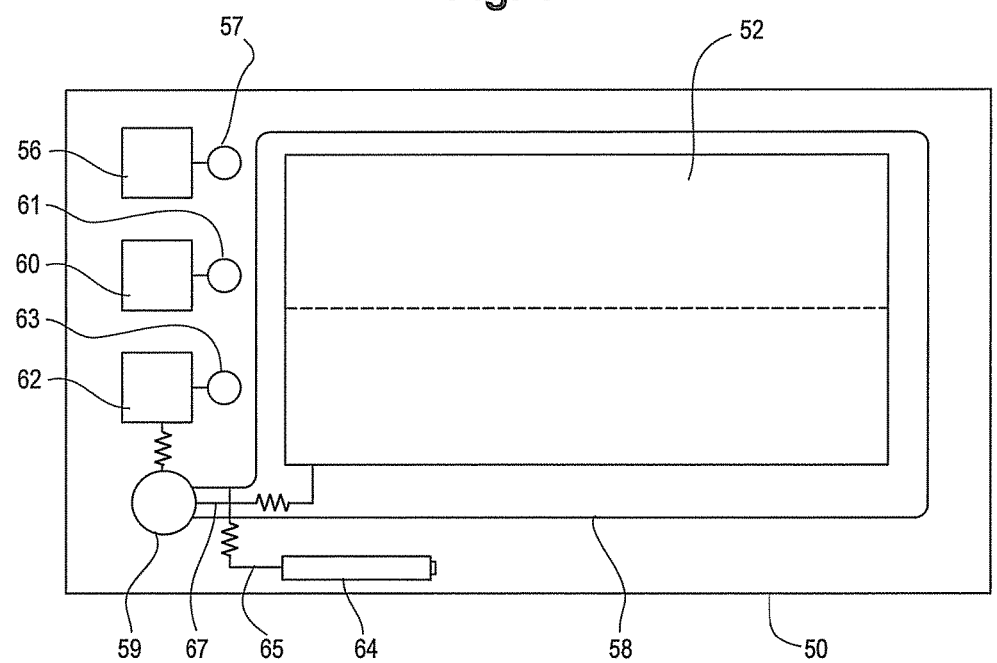
FIG. 1 is a schematic diagram of one possible visible RFID tag embodiment of this invention.

In one embodiment, the display is a visual RFID tag (50) shown in FIG. 1. Visual RFID tag (50) includes a display (52). Display (52) can be a single display or it can be a display that is segmented into two or more separate display portions or sub-displays as is shown by the hatched line in FIG. 1 so as to display more than one item of information simultaneously. Display (52) may be hard wired to an external power source such as an AC source or it can have an internal energy source. A display internal energy source can be any source of power that is able to activate and change the information displayed on a display (52). Examples of internal energy sources include a battery (64) or an RF energy harvesting structure such as an antenna (58).

RFID readers have antennas that are used to emit RF radio waves—a form of energy. The RF energy from the reader antenna can be "harvested" by antenna (58) and used to directly power the tag microchip to reflect its signal back to the reader. In this embodiment, display (52) changes state or image through the use of power discharged from RF energy that was harvested by the passive integrated circuit when the display was pinged by a nearby RFID reader. The discharge can cause the display communications to turn on and accept an image that is already in the network queue waiting for update. Alternately display (52) can house a memory that has pre-set images that can be called up by the network to update the display screen. Alternatively, a passive powered circuit can house a low cost replacable battery for longer communications cycling. Alternatively, a low cost RF signal emitter, i.e., a trigger emitter can be used to power up the RFID chip and cause it to become active and to activate a display microcontroller without the use of a higher power standard RFD reader and in this way, lower the cost of the devices required to activate or trigger a display microcontroller to turn on an accept an image change.

Antenna (58) which can be used to power the IC of a passive RFID tag can also power a capacitor (54) for discharge to turn on one or both of the communications module (62) of the display to gather information to be shown on the persistent display via encoded RF signals and/or to power the display so that the displayed information can be updated or altered. If the display is internally powered, then the display will preferably take advantage of technology—e.g., using a persistent display—to hold a persistent image without power.

If a battery (64) is used in RFID display (50), then it can be associated by electrical connection (65) with display (52). If a capacitor (54) is used to power display (52), then it can be associated by electrical connection (67) with display (52). Capacitor (54) is further associated with an energy harvesting structure such as antenna (58) to allow capacitor (54) to collect and store energy from RF sources such as RFID readers.

Visual RFID tag (50) further includes an RFID tag (56), a display microcontroller (60) and a communications module (62). RFID tag (56) can be an active tag or a passive tag both of which are useful to serialize an asset or item with a unique identifier. In this manner the asset and especially a traveling asset can be identified by, for example, a unique RFID tag identifier and location before a display associated with the asset is updated. RFID tag (56) is preferably a passive unpowered tag. RFID tag (56) may either be a read-only tag having a factory-assigned serial number that is used as a key into a database, or it may be read/write tag, where object-specific data can be written into the tag by the system user. Field programmable tags may be write-once, read-multiple; "blank" tags may be written with an electronic product code by the user. Some RFID tag IC's are capable of being rewritten. RFID tags that have IC's that can store new data have many potential applications such as on reusable containers and other storage assets. When the contents of the container are changed or the container is moved, new information can be written to the tag and, in the case of the present invention—presented visually.

RFID tags (56) are well known to include two parts—an integrated circuit for storing and processing information, modulating and demodulating a radio-frequency (RF) signal, collecting DC power from the incident reader signal, and other specialized functions; and an antenna (57) for receiving and transmitting a signal.

Visual RFID tag (50) further includes a display microcontroller (60) that drives display (52). By "driving" display (52) it is meant that display microcontroller (60) either holds or collects information to be displayed visually on display (52) and then causes display (52) to display the visual information. Display microcontroller (60) can optionally wake display (52) from a sleep mode and/or direct display into a sleep mode. Such wake-up calls can also be performed by RFID tag (56).

The display can further include a communications module (62) or an IC that is programmed to support multiple communication protocols in order to make the display useful in a wide variety of wireless communications networks. Communications module (62) provides for unidirectional or bidirectional communications between visual RFID tag (50) and a central control station (200) either wirelessly or through a hard wired cable. It is preferred that communications module (62) is a wireless communications module that communicates directly or indirectly with central control station (200) using one or more known or future develop wireless communications protocols. The term "wireless communications protocol" is used herein to refer to any short or long range wireless protocol that allows an electronic device to exchange data wirelessly (using radio waves) locally—from device to device—over a computer network, including high-speed Internet connections. Examples of some currently useful wireless communications protocols include, but are not limited to Bluetooth, Zigbee, 802.11 and devices and networks including a combination of these protocols.

Communications module (62) may also have a unique identifier that transmits its unique identifying information to an RFID reader upon interrogation with an RF signal. The unique identifier can be provided in the form of an RFID chip and antenna. Communications module (62) can include an optional antenna (63) for receiving information to be displayed on display (52) in which case its unique identifier will allow it to identify and compile—among all the data that is being transmitted to and from an RFID driven display network—that data that is being transmitted to the specific visual RFID tag (50) for display on display (52).

Antennas (57), (61), (63) and energy harvesting structure (58) may be discrete individual antennas or structures. Alternatively, two or more of the antennas can be combined to form a single antenna/power harvesting structure that can be used by two or more of the visual RFID tag components discussed above and to harvest power for display (52).

The visual RFID tag (50) of this invention is capable of displaying visual information intermittently or persistently and then displaying updated or new visual information. Information displayed on display (52) of visual RFID tag (50) can be easily updated, even if the tag is associated with a moving asset and is itself moving. The update process begins with a display prompt such as with an RFID reader interrogating or "pinging" a particular area covered by the RFID reader. The RFID reader then receives RFID tag information from any RFID tags in its vicinity that were activated by the ping. The RFID tag information includes unique identifying information for any responding RFID tag. Alternatively or in addition, unique identifying information about communications module (62) may be transmitted to the reader or directly to a central control station via a communications network. The reader then transmits any collected RFID tag information to central control station (200). Central control station (200) determines, for example, that the visual RFID tag (50) associated with RFID tag (56) is in a new location because a new RFID reader or new antenna associated with the RFID reader has collected the RFID tag information. Based upon the change of location of the RFID tag—another type of display prompt—the central control station (200) sends instructions via communications module (62) to visual RFID (50) to change what is displayed on display (52). The communications module (62) directs the instructions to display microcontroller (60) which in turn sends new or updated information to display (52). The new display information can be provided by central control station (200) or the new display information can reside in the RFID tag memory or in any other tangible memory device associated with visual RFID tag (50). Central control station (200) transmits new display information of display instructions to visual RFID tag (150) in one embodiment by transmitting the information and/or instructions to a wireless hub (300) wherein the information/instructions are wirelessly transmitted to communications module (62). The communications module (62) directs the new information/instructions to display microcontroller (60) which in turn compiles and translates the new digital information into information that is displayed on display (52) in the form of updated visual information. In this exemplary method, RFID tag (56), communications module (62), display microcontroller (60) or none of these can activate capacitor (54) to power visible display (52) so that the new visual information can be displayed on display (52).

The RFID display networks of this invention will typically include more than one and most often a multitude display devices that are operated together to provide logistical and/or dynamic display solutions.

RFID Readers

A second component that is useful in the RFID display networks of this invention are RFID readers. The RFID readers can be generally available RFID readers, a novel "edge reader" of this invention or a combination of the two.

Commercial Readers

The RFID display networks of this invention will typically may include on or more commercially available RFID readers, controllers or reader/controller combination devices. A reader is a device used to communicate with RFID tags, it has one or more antennas that emit radio waves (to interrogate or ping RFD tags) and receive a signal back from the tag. Tag readers are also sometimes called interrogators. RFID readers operate in part by retrieving RFID tag data—e.g., a unique tag identifier—by broadcasting radio waves at the tag and converting the waves the tag returns to the tag reader into data.

RFID reader antennas can come in many different forms. The readers can further include more that one of the same type of antennas and they can include two or more antennas that serve different purposes. In one embodiment a reader will have at least one broadband linear antenna, and two circular LHCP, and RHCP antennas. In another embodiment, the reader can include two or more antennas to communicate/control/program integrated circuits associated with passive RFID tags as well as one or more antennas to communicate wirelessly with the network wireless hub. In another embodiment, the antennas are associated with edge type controllers with wireless connections to create the ability to filter data, and message smart consolidated and relevant data.

One type of commercially available reader is known as an all-in-one-reader. An all-in-one-reader is again a small form factor product that houses a reader and antenna and can connect using coaxial cables or wirelessly to other reader antennas. This unit will be powered by a fixed power source and is capable of communicate to wireless hub and/or directly to a central control station via a wireless network, 802.11, ZIGBEE, or by using other known or future developed wireless communications protocols. When an all-in-one-reader is installed in a retail network, it can become the master control unit for a zone of reader antennas and, in such capacity, will serve as the in store communications link where it would optionally monitor and connect the zone properly. This unit once operational has the capacity to be converted to a battery operated system A useful type of RFID reader antenna is a unique antenna. A unique antenna reader has one or more antennas that are associated with a passive RFID tag with a unique identifier. When a reader emits as ping, the antenna will always at least read the identifier of the RFID tag associated with the one or more unique antennas. If a second RFID tag is also interrogated by the antenna—say a visual RFID tag—then the reader will transmit the unique antenna RFID identifying information and the visual tag RFID identifying information back to the control station. In this way, the control station will be able to identify the location of the visual tag on the basis of the known antenna location and not just on the basis of the reader location. Unique antennas make it possible for a single reader to be associated with a multitude of antennas such as 4 to 30 antennas or more where the location of each antenna is known. The use of unique identifier antennas allows the cost of a network to be reduced because lower cost antennas can be used to replace more costly readers. Additionally, the cost to install a reader with a multitude of antennas is reduced by the reducing the wiring associated with the reader.

There many types of commercially available RFID reader/antenna and reader/antenna/controllers—referred to collectively herein as readers or reader/antennas. The RFID readers useful in the RFID display networks discussed below may have different attributes. However, it is preferred, but not required unless stated otherwise below, that all of the RFID readers are associated with more than one RFID directed antenna and that the readers are able to communicate wirelessly (as opposed to via a dedicated cable) either directly or indirectly with central control station (200). One examples of a useful RFID tag reader/controller is the Omni-ID Tag Controller. Non-limiting examples of useful commercial RFD readers are Impinj, Speedway Revolution, Sirit Infinity 610, Motorola FX9500 and the Intermec IF2.

Edge Readers

A unique component of certain RFID display networks of this invention is a self-powered edge reader. The edge reader is a battery powered RFID tag reader that can be used to interrogate but, due to the power required to interrogate RFID tags, it is typically used as a read-only RFID tag reader. In a further effort to make the edge reader more useful, a short range communications system is incorporated into each reader so that a plurality of readers can relay a communication initiated by one edge reader across a distance to a communications hub where the total communications distance of the plurality of edge readers is greater than the communications distance of a single reader. Since the edge readers of this invention are self-contained, then can be easily added to a wall, shelf, doorway, ceiling etc. . . . to supplement the ability of an RFID reader to collect RFID tag information where the RFID reader read range is negatively impacted such that it is unable to collect information from all interrogated tags within it read range.

Figure 2:
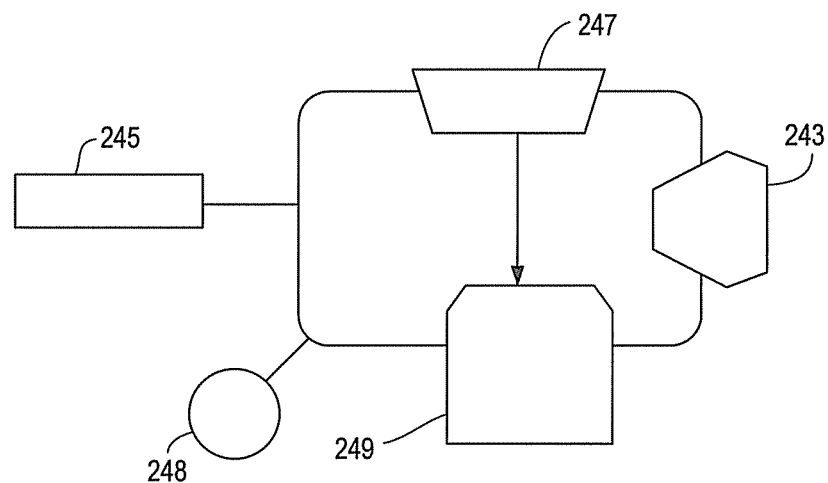
FIG. 2 is a schematic of a base station reader that is compatible with one or more edge readers of this invention.
Figure 3:
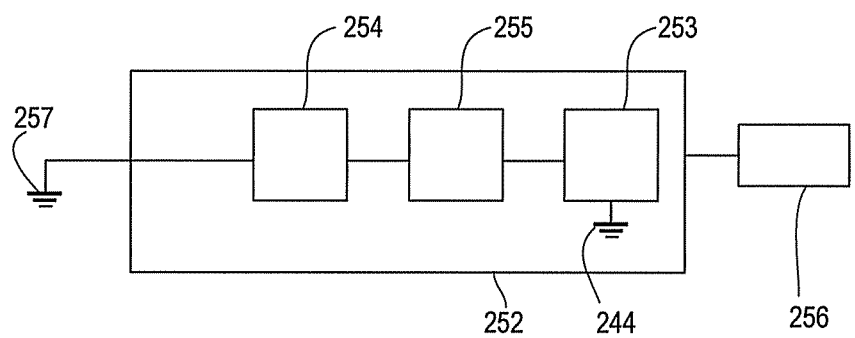
FIG. 3 is a diagram of an edge reader embodiment of this invention.
Figure 4:
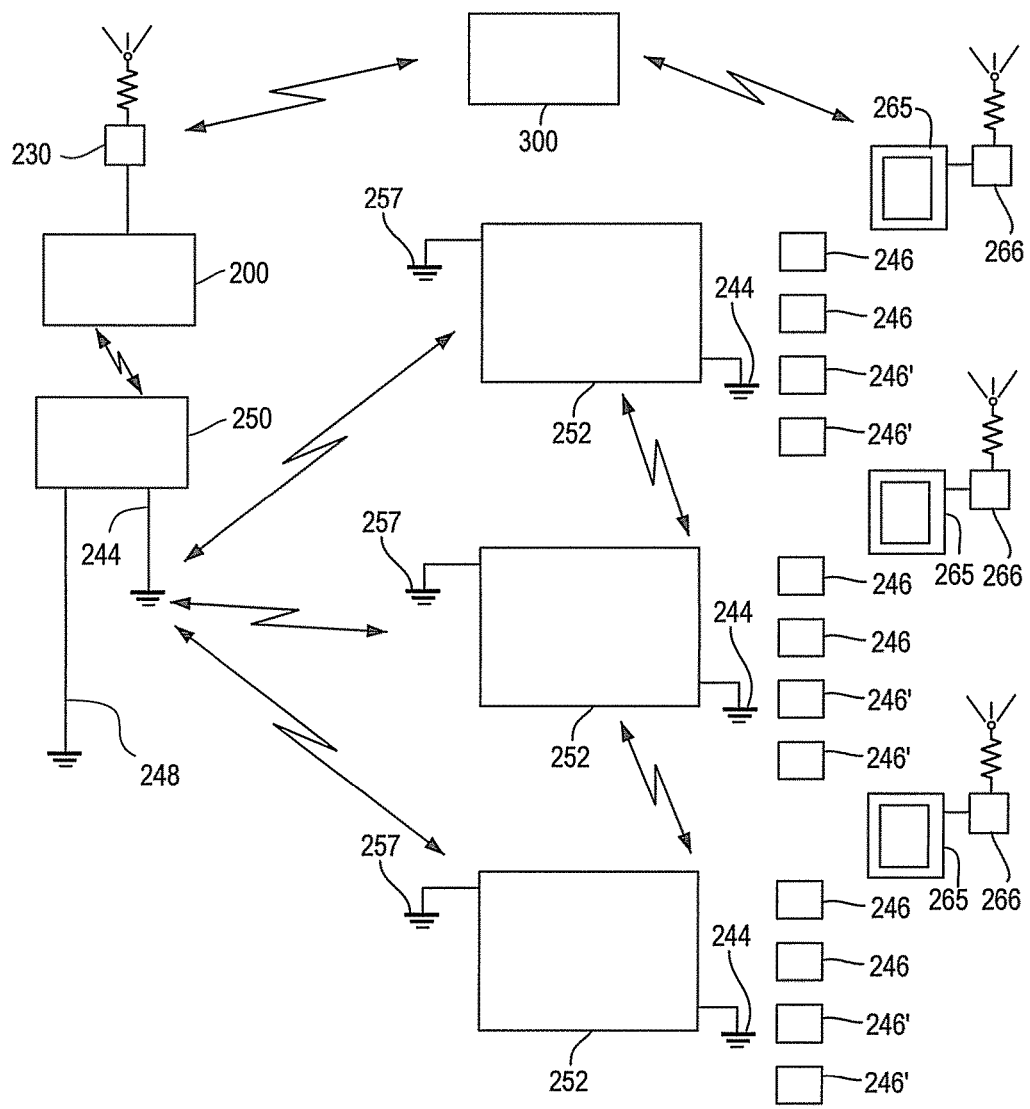
FIG. 4 are details of a base station embodiment of this invention that is useful for interrogating UHF RFID tags in an edge reader network of this invention.

FIGS. 2-4 are directed to edge readers of this invention. In particular, FIG. 3 is a schematic of an edge base station reader (250) of this invention. FIG. 3 is a diagram of an edge reader embodiment of this invention, and FIG. 4 is an embodiment of a display network including two or more edge readers of this invention. The edge reader network extends the RFID read range of the base station reader (250) through the use of a plurality of low cost low power wireless edge readers. The term read range refers to the distance over which a reader can accurately "read" or acquire information from an interrogated RFID tag. Read range can further be negatively impacted by environmental conditions such as weather and it can be negatively impacted by the presence of physical items such as walls, columns, shelves, other tagged items etc . . . . Thus a reader might have a long read range in one direction and a shorter read range in another due to physical obstructions.

Referring now to FIG. 2 there is shown a base station (250) useful in conjunction with one or more and plurality of edge readers (252). Base station (250) includes an RFID reader (249) that is capable of reading information emitted from interrogated RFID tags that lie within the readers read range. Base station (250) also includes a first emitter antenna (248) that is used to emit an RF interrogation signal and to receive return data from nearby RFID tags. Base station (250) also includes a first communications device (247) that wirelessly receives data transmitted from any edge reader (252) in the vicinity of base station (250). First communications device may be device that operates based upon any of the communications protocols discussed herein or based upon any future developed protocols. In one embodiment, first communications device (247) is a Zigbee radio.

Base station (250) further includes a power supply (245) and a second communications device (243). Second communications device (243) may be a wired or wireless communications device that allows base station (250) to send acquired RFID tag information to central control station (200). In one preferred embodiment, second communications device (243) is a wireless communications device that transmits tag information to central control station (200) via a wireless hub.

FIG. 3 is a block diagram of an edge reader (252) of this invention. Edge reader (252) includes an RFID reader (253) having an antenna (244) and a wireless communications device (254). Edge reader (252) further includes a microcontroller (255) to coordinate the movement of data between the RFID reader (253) and communications device (254) and/or to control the wireless transmission of data from the edge reader (252) to base station (250). The RFID reader can be any reader that is capable of acquiring information from an interrogated RFID tag. In one preferred embodiment, the RFID reader is a UHF RFID reader. Communications device (254) can be any device that is able to wirelessly communicate the acquired RFID tag information over the distance between the edge reader (252) and base station (250). It is preferred that communications device (254) is a Zigbee radio which includes an antenna (257). Edge reader (252) has a power source (256) that is selected from an external power source such as direct AC or DC power or from an internal power source such as a batter. It is preferred that edge reader (252) is internally powered with a battery. Moreover, edge reader (252) may include a unique identifier such as an IP address so that its location can be ascertained by central control station (200).

1. In operation, base station (250) will ping or interrogate all RFID tags in its vicinity with an appropriate RF signal. The reader (253) of edge reader (252) collects information emitted by nearby RFID tags transmits the tag data wirelessly via communications device (254) via any useful wireless communications protocol. Since edge readers (252) will likely be located only a short distances—up to about 250 feet maximum—from base station (250) communications device (254) preferably uses a short range wireless communications protocol such as Bluetooth or Zigbee. The wireless data from edge controller (252) is collected by first communications device (247) and directed to reader (249) where the incoming data is demodulated. Reader (249) then transmits the demodulated data to second communications device (245) which in turn transmits the demodulated data using an appropriate communications protocol to a communications network such as a wireless hub (300) and then on to central control station (200). Alternatively, second communications device can direct the data directly to central control station (200) without using an intermediate communications network. When second communications device (243) transmits information wirelessly over a longer distance, then it would be preferred that a wireless communications protocol such as 802.11 be used to transmit the data to a wireless hub or base station and, therefore, second communications device (243) would be a Wi-Fi communications device.

One application for edge readers is in retail stores as will be described below. In this application, there will be many items tagged with RFID tags so it is preferred in that the RFID tags are cheap UHF RFID tags and that the readers (249) and (252) are UHF RFID tag readers. FIG. 4 is a block diagram of a preferred base station embodiment of this invention that is useful in retail and other applications that use UHF RFID tags. In FIG. 4 there is shown an interconnect board (275) which is electrically associated with the other devices shown. Interconnect board (275) may include an MCU to control the operation of the edge controller and/or to coordinate the collection and transfer of collected RFID information. The base station further preferably includes a JENNIC Zigbee communications device (277) manufactured by NXP Semiconductors, Eindhoven, The Netherlands, which includes an antenna (276). Also associated with the interconnect board (275) is an Austria Microsystems AS3992 UHF RFID reader (279) along with an RFID antenna (287) including a passive RFID chip. The base station further includes an 802.11 wireless communications device (281). Finally the base station is powered by one or both of a battery (283) or by an AC or DC power supply (285).

Figure 5:
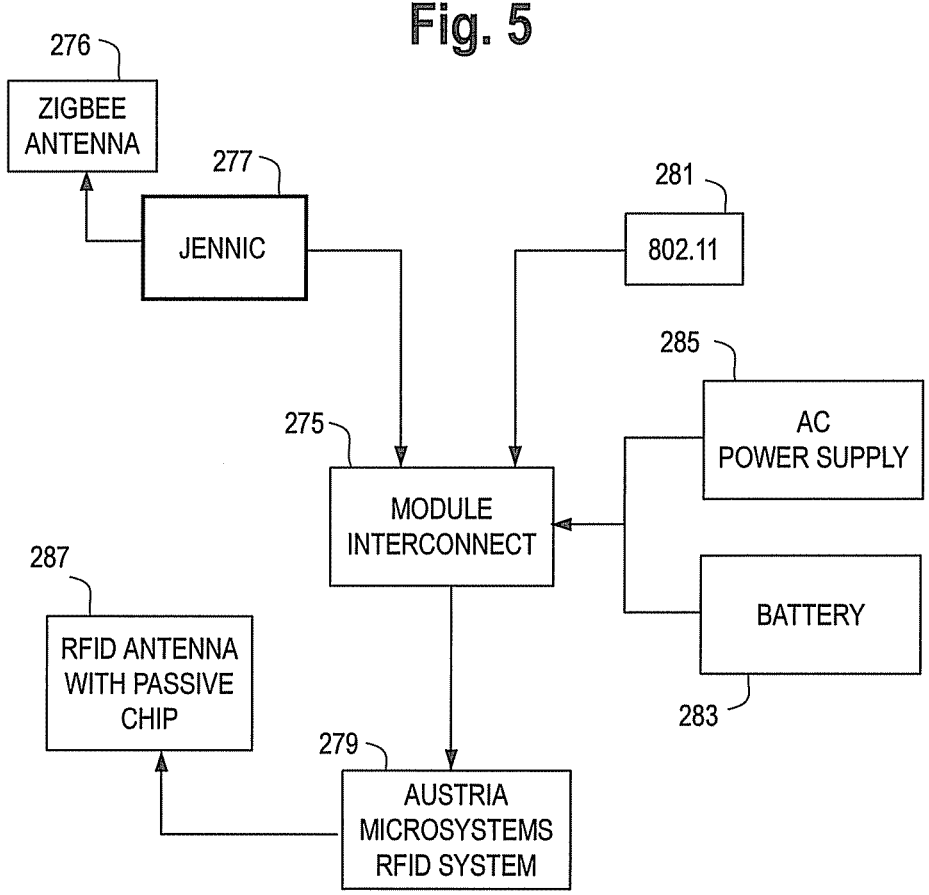
FIG. 5 is a schematic of a RFID network including a plurality of edge readers of this invention.

An example of an RFID driven display network including edge readers (252)—an edge communication network—is shown in the FIG. 5. The edge communications network shown in FIG. 5 consists of a plurality of edge readers and at least one base station. As noted above, for UHF applications, the edge readers and base station will preferably include Zigbee radios which provides for the transmission of tag information obtained by the edge reader to the base station and ultimately back to a central control station.

In the network, edge readers (252) are used to extend the read range of a base station reader (250) which can be a traditional commercial RFID reader. The network shown in FIG. 5 includes a plurality of edge readers (252) each including an RFID reader (253) and a wireless communications device (254). RFID reader (253) is preferably a small RFID reader with low transmit power but high access sensitivity. An example of a useful reader is an AS 3991 UHF reader manufactured by Austria Microsystems. Since edge controllers (252) are wireless, no wires are needed to connect them with base station (250) making the system low cost and easy to deploy.

In FIG. 5, a base station (250) along with an associated emitter antenna (248) is the main RFID reader. Base station (250) can directly acquire information about interrogated RFID tags (246) that are located in close proximity to antenna (248). An example of a base station reader useful in this network is an Impinj reader. The Impinj Reader is a standard UHF RFID reader operating under the C1G2 protocol. It will access tags located close to the antenna, and it will simultaneously transmit power to those tags located out of its communication range.

In addition, base station (250) can receive, demodulate and transmit RFID data acquired by one or more of the edge readers (252). Where UHF RFID tags are used, the edge reader will preferably include wireless communications device in the form of a Zigbee radio, which transmits the tag information obtained by reader (253) to base station (250). Zigbee is a specification for a suite of high level communication protocols using small, low-power digital radios based on an IEEE 802 standard for personal area networks. The edge reader is comprised of, for example, an 8051 MCU to coordinate the protocol and an AS3992 RFID reader controller chip. The antennas used on the base station and edge readers are preferably the same model antenna in order to maximize antenna gain.

Each edge reader (252) can transmit collected RFID information and other data directly to base station (250) or indirectly by wirelessly transmitting the collected RFID data from a first edge controller to an adjacent second edge controller and so on until the collected data is received by base station (250). Thus, for those RFID tags (246) located close to base station antenna (248), the base station will acquire information about these tags acting as a standard RFID reader. For those tags (246') located out of the reading range of the base station, the base station simply sends power through the base station antenna to these tags to ping or interrogate them. Then an edge reader (252) will access data from these tags powered up by base station (250). In this manner, edge readers (252) extend the read range of base station (250) by obtaining tag information at an extended range from that which base station reader (250) can access, and transmitting the tag information wirelessly, or optionally through a wired connection, back to base station (250).

Also shown in FIG. 5 is a display (265) associated with each edge reader. Display (265) can be an RFID driven display or it can be a standard display. Display (265) may be connected to central control station (200) by any method that allows the central control station to control and update what is displayed on display (245). For example, display (265) can be hard wired to a communications network or directly to the central control station. Alternatively, display (265) may include a communication chip (266) that allows it to communicate with a central control station via a wireless hub (300). In the network of FIG. 5, the displays (265) are controlled and operate independently of edge readers (252) and base station (250).

Trigger Emitters

Another component that is useful in the RFID driven display networks is a trigger emitter. A trigger emitter is a device that functions only to interrogate RFID tags—it does not read or demodulate RFID tag information. The trigger emitter is preferably powered by an external DC or AC power source but can be internally powered. A trigger emitter is cheap and has a small form factor so it is easily mounted on the side of a door, on a shelf, on a conveyer and so forth. A trigger emitter includes an antenna that sends wireless energy to wake up an RFID tag associated with a display device. It can also include encoded information about its location that can be acquired by a central control station each time a trigger emitter is active. In addition, the trigger emitter can be used to wake up an RFID tag associated with, for example, an audible alarm or any other type of RFID activatable device. A trigger emitter will preferably have variable power settings that allows for the adjustment of the wavelength of the emitted RF energy. Preferably the trigger device will emit power in the UHF band.

On one embodiment, the trigger emitter is useful to activate an RFID tag driven display. To do this, the trigger emitter is activated and it emits an RF pulse. The RFID tags that respond to the pulse wavelength become momentarily active as a result of the pulse. When the RFID tag is active, it wakes up or ac that is hard wired to a communications network or that communicates with a central control station via a wireless hub activates a display microcontroller associated with the display at which time the display microcontroller stands by to receive instructions from the central control station to update the display associated with the visual tag. Using a trigger emitter to ready a visual tag to receive updated display data eliminates the need to us a more costly RFID reader for the same purpose.

In still another use, the visual RFID tags may be used in applications where the information displayed on display (152) can be changed by the network based on an encoded RF trigger. For example in one embodiment of this invention, the passive display can be associated with an item undergoing multiple process steps such as assembly steps. Information specific to steps in the process or an assembly decision point can be stored in or directed to the IC and the display can be updated with the new process information when the tag is triggered by a reader or some other RFID activating mechanism at a specific location or at the decision point in the process. All of this can be accomplished without a direct electrical or signal connection.

In still another use, the visual RFID tag embodiment is used in applications where the information displayed on display (152) can be changed by the network based on an encoded RF trigger. For example in one embodiment of this invention, the passive display can be associated with an item undergoing multiple process steps such as assembly steps. Information specific to steps in the process or an assembly decision point can be stored in or directed to the IC and the display can be updated with the new process information when the tag is triggered by a reader or some other RFID activating mechanism at a specific location or at the decision point in the process. All of this can be accomplished without a direct electrical or signal connection.

In addition to waking up an RFID tag, a trigger emitter can be used to control a display. A trigger emitter will preferably have a unique code/identifier that is transmitted each time that it is activated. The unique code associated with a trigger emitter can be used to elicit a specific visual response in a display that includes a display RFID tag without need for a wireless update from a central control station. In this embodiment, data for two or more displays of different visual information are held within, for example the chip associated with the visual tag. The unique identifier associated with a trigger emitter causes the visual tag to send the stored display information associated with the unique identifier to be displayed on the display. In this way, a visual RFID tag associated with a moving asset can updated merely by pinging the visual RFID tag with a trigger emitter so that the display displays information relevant to a present location of the moving asset.

Trigger emitters can also be used in a standard manner to allow a reader to acquire tag information. In this method, the trigger emitter would ping a first time to wake up an RFID tag and it would ping a second time to cause the same RFID tag to emit an RF signal that would include information based upon unique attributes of the tags thus making the trigger emitter useful for tracking RFID or visual RFID tagged moving assets.

Wireless Hub/Communications Network

Signals, commands and the like may be transmitted through the communications network or hub via wires or cables, or they may be transmitted wirelessly, or it may be partly wired and partly wireless. For purposes of this invention, the term "communications network" refers to any of these types of data communication networks or hubs.

At least a partly wireless communication network is preferred and completely wireless communications using one or more wireless hubs (300) is more preferred for a variety of reasons. First, wireless networks are easier to install because they do not require many cables and wires running throughout a store, factory or logistics center. Second, wireless communication networks may be less expensive and easier to install. One example of wireless transmission is accomplished by the use of frequencies available in the United States Federal Communication Commission Industrial-Scientific-Medical ("ISM") band, preferably in one of the ranges 300 to 450 MHz, 902-928 MHz and 2.45 GHz. Examples of standardized communication protocols useful for the communication network include: the 802.11 standards set by the Institute of Electrical and Electronics Engineers, Inc. (IEEE) located in Piscataway, N.J.; the Bluetooth standard, which was developed by an industrial consortium known at the BLUETOOTH SIG, located in Overland, Park, Kans.; the ZigBee™ standard (IEEE 802.15.4) developed by the Zigbee Alliance and or proprietary ISM band communication network. Cell phones, cell phone components and/or cell phone wireless networks may also be employed as a part of or the entire wireless communication network of the item monitoring system. Those skilled in the art recognize that different frequency ranges may be utilized as appropriate. A proprietary (non-standardized) communication protocol may be preferred for transmission to and from sensor electronics.

Components of the communication network may be installed by attaching them to existing structures in a store, factory or logistics center such as shelves, walls, ceilings and the like. In general, the wireless hubs or wireless communications devices will be installed at a spacing distance that will enable communication with every required location.

The Central Control Station

One or more central control stations (200) may be used to perform a variety of network functions such as monitoring the network, compiling data collected by the network, providing instructions to the network components, and providing a mechanism to generate new network instructions as well as to provide real time information to persons managing the network.

Figure 6:
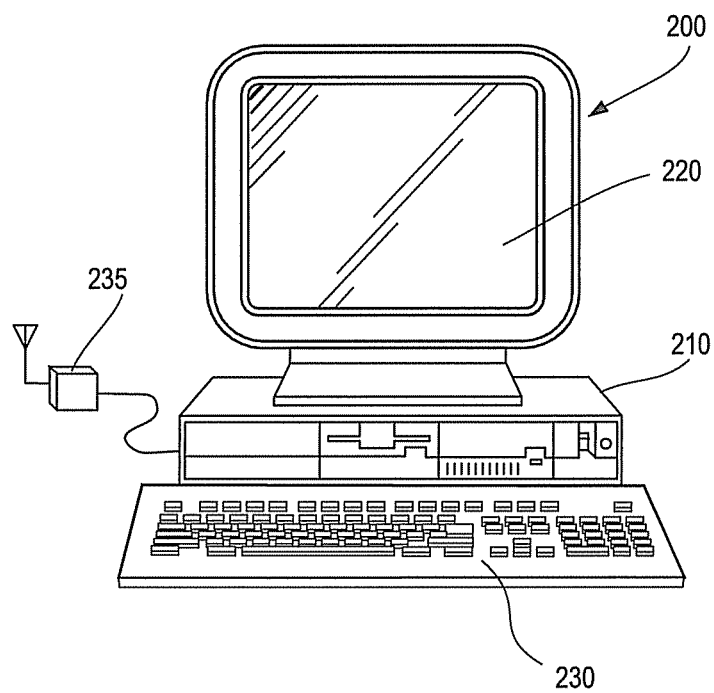
FIG. 6 is a schematic of a central control station (200) useful in the networks of this invention.

An example of a basic central control station is shown in FIG. 6. Central control station (200) will typically include a standard personal computer (210) as the primary component. Computer (210) will include a monitor (220) and a keyboard (230) and/or other input mechanisms. Computer (210) will be associated by wire or wirelessly through connection (235) to one or more network RFID readers. Connection (235) may include a WiFi connection to an internet hub where computer (210) can communicate (both send and receive digital information) with one or more network hubs. Computer (210) can be located in the vicinity of the RFID display network or it can be located remotely from the network.

Computers (210) are well understood in the art. A variety of different software programs known in the art may be used to collect the information sent by the reader/controllers and/or their associated antennas and to transmit information to the network components. One example of suitable software is MICROSOFT brand software SQL Server from Microsoft Corporation located in Redmond, Wash. The computer used in the central control system of this invention can also be programmed to operate the networks disclosed below using enterprise software sold, for example, by Oracle or SAP. In addition, RFID network hardware and tag manufacturers routinely offer software that can be installed in the memory of a computer used to operate the central control station and used to control the RFID networks and RFID driven display networks of this invention. One such product is Asset Track offered by Omni-ID, Rochester, N.Y.

Alternatively, customized software may be used. Commercial or customized software is used to process, organize and present the information from the sensing devices in a user-friendly format. For example, the software may be designed so that the locations of each visual tag is shown on a floor plan or that a status of the item associated with each visual tag—e.g., location, point in process—is displayed or able to be displayed These displays may be customized to present data to and interact with different users who may have different needs or interest. Many different information presentation formats will be apparent to those skilled in the art. The software may also be configured for periodic data collection from the visual tag, reader/controller or other network sensors or the computer can be programmed to collect data only upon request, or some combination thereof. It is also within the scope of this invention to use additional data, such inventory data or historical data, in combination with data obtained from the network sensors and devices to help improve the interpretation of the collected data in order to improve accuracy, to detect situations requiring additional attention or human intervention, and the like. Additionally, it is within the scope of this invention to use additional data capture methods such as video capture to aid in network operation.

Mesh Communication Networks

The network components discussed above can arranged in various combinations to create application specific RFID display networks. A first useful type of RFID display network is a mesh communication network. A mesh net communications network is an RFID display network that includes a plurality of RFID readers each including one or more and preferably a plurality of antennas. The plurality of RFID readers can communicate with one another wirelessly and they can communicate wirelessly with a wireless hub (300). The combination of multiple readers with multiple antennas results is a single reader/antenna mesh that is able to interrogate and identify the location of RFID tagged assets and in particular moving RFID tagged assets where only the RFID readers are hard wired to a power source. The readers used in the mesh communications networks of this invention can be conventional RFID readers or they can be the base station/edge reader network combination discussed above or any combination thereof that will provide as close to 100% RFID tag read coverage as possible.

The mesh reader and associated antennas will be arranged so that the locations/status of visual RFID tags that are being actively used within the network boundaries can be ascertained. In a mesh communications network, the term "mesh antenna" includes standard RFID reader antennas, unique antennas a discussed above and edge readers as discussed above. In an RFID system communication typically occurs within a reader system and integrated circuit. A mesh network allows for communications to occur between and within the base of installed transceivers and correlation of data to occur in real time between the transceiver stations. In the mesh communications network, it is not necessary for each transceiver to be hard wired to a central control station or even to be hard wired to one another.

Correlation of data provides several functions such as including accurate real time location of RFID tagged assets, identifying change of state of assets, providing security alarms and environmental conditioning to name a few. The readers typically work independently. The mesh communications network can use different methods such as time delay of arrival of RFID information and relative RFID information signal strength to identify the visual RFID display's location in a mesh network. In one method, the mesh network triangulates the location of the visual RFID display and updates the display to display the location information or information relevant to the location so that the display presents an image or flag specific to the location for visual communication to humans in the process. Alternately the updated information communicated to the humans in the process can be in digitally enhanced voice messaging, or sound based alarm type systems.

Figure 7:
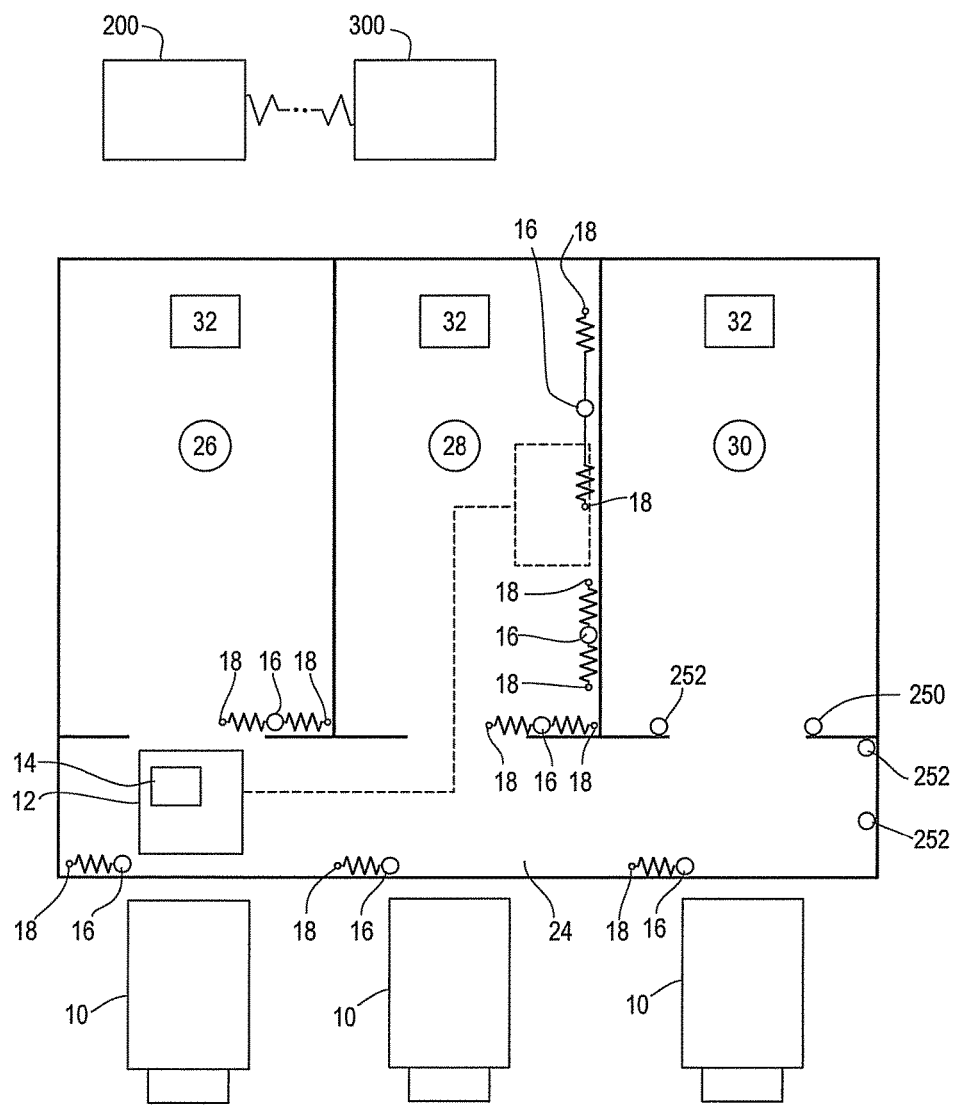
FIG. 7 is schematic of a mesh communications network embodiment of this invention.

FIG. 7 is a schematic of one example of a mesh communications network of this invention. FIG. 7 shows a logistics center for receiving, collating and repacking and then delivering articles to a second location. The logistics center includes a loading dock (5) including a plurality of trucks (10). The logistic center further includes a plurality of work zones—zone 1 (26), zone 2 (28) and zone 3 (30). A plurality of RFID readers (16) each including one or more antennas (18) and/or a plurality of edge readers (252) and associated base station(s) (250) are distributed throughout the logistics center in locations where they can interrogate RFID tag. The readers can be powered by hardwiring them to an electrical outlet or they may be battery powered. The readers, their associated antennas and/or edge readers will typically be located in doorways, on loading docks and in the work zones where articles or trolleys might move. In FIG. 7, a visual tag—a persistent display including an embedded RFID tag—(14) is associated with a trolley (12). The mesh communication networks further includes a wireless communication hub (300) that is associated with central control station (200). The logistics center may include a single wireless hub (300) or it may include a plurality of wireless communications devices where each of the one or more wireless communication devices are associated with control station (200) and optionally one another either by hardwire or wirelessly. If a single wireless communication hub (300) is used, then the reader and associated antenna(s) (16 and 18) can be capable of relaying information wirelessly to and from any RFID tag associated with a display throughout the logistics center. In other words, the reader/antenna combinations (16/18) are capable of transferring data from a first reader antenna to a second reader/antenna and so forth until data received from or being sent from the control center to a display or from a display to a control center via a single wireless communications hub (300) is received.

The following is an example of how a mesh communications network might operate a dynamic environment:

At location A, a visual tag (14) including a uniquely identified RFID tag is associated with a trolley (12).

Trolley (12) is directed through doorway B and into zone 2 (28). As trolley (12) passes through doorway B a reader (16) in doorway B pings the RFID tag and learns, via antenna (18) that the trolley including the display and unique RFID identifier is moving through doorway B and relays this information via wireless communications hub (300) to control station (200).

At this point control station (200) can be programmed to transmit location instructions to trolley (12) which instructions are transmitted to reader/antenna (16/18) and from there to visual tag (14). The RFID tag associated with visual tag (14) is activated; the IC is programmed with new instructions or activated to perform specific preprogramed instructions—those instructions being to alter the visual tag display to identify a location in Zone 2 in which trolley (12) should be located.

Trolley (12) is placed in location C in Zone 2 at which point a nearby reader/antenna pings the RFID tag associated with display (14) to relay the location of trolley (12) to control station (200).

At this point, control station (200) can be programmed or directed to transmit instructions to alter the display of visual tag (14) to identify a task to be performed on the contents of trolley (12) at location C.

If trolley (12) is moved to a different location in zone 2 or into zone 1 or zone 3, the readers/antennas located in these areas will identify trolley (12) as it moves through the logistics center so as to provide a precise location of trolley (12) to control station (200). Other uses of the mesh communication network will be apparent to one of skill in the art.

Retail Networks

In the retail industry RFID systems have been created to take inventory at the shelf and report back to in-store personnel in the form of reports and/or real time alerts. These systems work through the use of UHF RFID tags that are place on the products being sold. The physical retail store display is modified in this invention method with a unique combined display. The display is preferably a persistent or battery powered display this includes an integral RFID reader and antenna system. The combined displays can be placed on store shelves such that it will read adjacent products tagged with an RFID tag and send this data to a central collection point for data collection, analysis and report generation. The retail solution network of this invention provides interactive solutions for the retail shelf. The interactive solutions might include electronic displays for the retail store which, for example, creates electronic pricing systems in store. An improvement provided by this network is the incorporation of a RFID tag reader/antenna system into the electronic display in a manner that allows information, such as pricing information displayed at the store shelf to be modified very quickly and easily using RF signals to update the pricing.

Another aspect of this invention is the use of the combined RFID reader/electronic display to create interactive consumer sales. An example of such an interactive consumer sale might include the detection of the movement of goods by a consumer at the store shelf by the system—e.g. the absence of RFID tagged product on the shelf which indicates the product has been removed from the shelf—that would trigger the system to send an update to the associated display unit. An example might be that as the consumer takes one item from the shelf, the display updates to give the consumer the message "buy one get one free", or call this number for a free coupon. Possibly the consumer message might be to advertise an associated products in the store, or even perhaps an item sold through other retail outlets.

As noted above, one component of this network is a small self-contained RFID reader/display system. The system, shown for example at the bottom of FIG. 1 would include an RFID reader, an associated antenna and a low power display. The system would also include a battery. Optionally, the system is a "peel and stick" device for quick and easy set-up. The system would preferably incorporate self-diagnostics, communications and data collection and display options. In addition the system preferably includes an edge data logic on micro-controller with small form factor reader antenna. Finally the network will preferably interact with inventory management packages loaded to a PC, phone, or other mobile devices.

Figure 8:
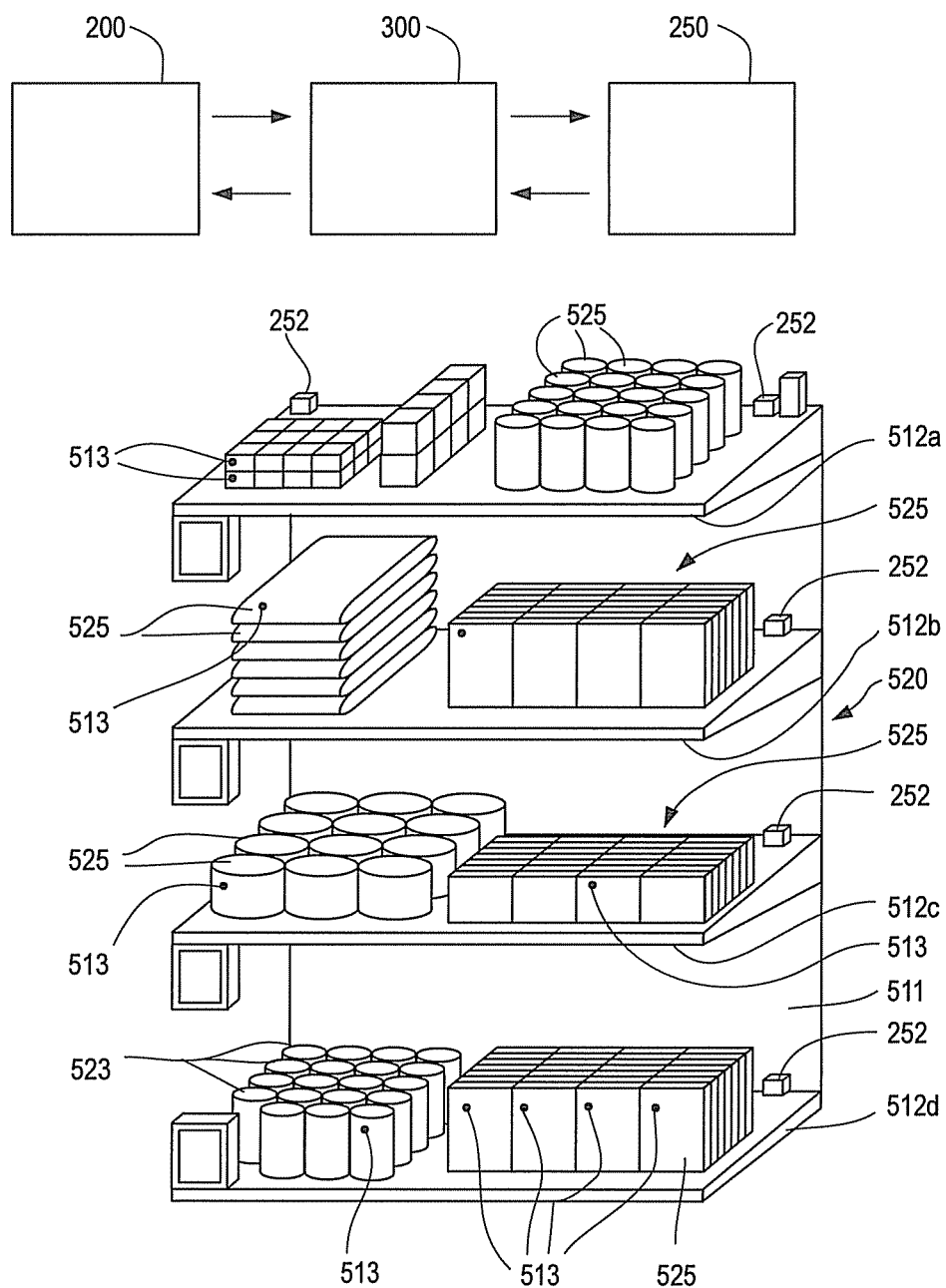
FIG. 8 is a schematic of a retail network embodiment of this invention.

FIG. 8 includes a schematic of a network that uses edge readers in a retail application. The retail network preferably includes a shelf arrangement (520), which includes a plurality of shelves (512). The shelf arrangement (520) includes a first shelf (512*a*), a second shelf (512*b*), a third shelf (512*c*), and a fourth shelf (512*d*). Shelf arrangements (520) are commonly found in retail stores and other establishments. Therefore, it is anticipated that existing shelving in stores will be used for the retail network.

Each shelf (512*a*-512*d*) includes at least one associated edge reader (252)—i.e., and antenna (254) and an edge controller (256) associated with it. The term "associated with" and its variants as used herein means that edge reader (252) and its components may be built into or be part of the shelf (512) itself, or it may be attached to a shelf surface or to the rear shelf panel (511). Consumer items (525) will typically be arranged on shelves (512a-512b) similar to how products are typically arranged on a shelf in a retail or wholesale store today, with like items all grouped together. Consumer items (525) on each shelf will be tagged with an RFID tag (513). Preferably all of the items on each shelf will be RFID tagged. RFID tags (513) can each be unique or they can share identifying attributes. In that way tags with the same attributes—e.g., numeric identifier—can be used to tag shelves containing multiples of the same item. It should be noted that the retail networks of this invention may include edge readers (252) mounted to almost any surface that is not part of a shelf arrangement, such as the bottom or any side of a basket or bin, a countertop, a pallet, a surface on the outside or inside of a case or cabinet, the top of a stand or table, or other surfaces that may be used to display or store items, so long as the items to be detected are placed within the sensing space associated with the sensor.

Edge controller (252) will operate as described above to extend the RFID read range of base station (250) to provide essentially 100% read coverage of the RFID tagged consumer items. That way the retail solution reader network can provide complete RFID tag information to central control station (200) via a communications network. In one embodiment, the tag information is obtained at set time intervals; in another tag information is obtained by the edge reader network upon the occurrence of an event such as a person removing an RFID tagged consumer item from a shelf. The communications network and central control station may be connected to other devices that interface with store personnel, customers, suppliers, shipping or delivery personnel and so on, or to other devices or equipment that interface with computers, servers, databases, networks, telecommunication systems and the like.

As noted above, the tag information being directed to central control station is directed wirelessly to base station (250). Signals from base station (250) to central control station (200) and return commands and the like may be transmitted through the communications network via wires or cables, or they may be transmitted wirelessly, or it may be partly wired and partly wireless. At least a partly wireless communication network is preferred and completely wireless communications are more preferred for a variety of reasons. First, it helps to avoid the unsightly appearance of cables and wires running throughout the store. Second, wireless communication networks may be less expensive and easier to install. One example of wireless transmission is accomplished by the use of frequencies available in the United States Federal Communication Commission Industrial-Scientific-Medical ("ISM") band, preferably in one of the ranges 300 to 450 MHz, 902-928 MHz and 2.45 GHz. Examples of standardized communication protocols useful for the communication network include: the 802.11 standards set by the Institute of Electrical and Electronics Engineers, Inc. (IEEE) located in Piscataway, N.J.; the Bluetooth standard, which was developed by an industrial consortium known at the BLUETOOTH SIG, located in Overland, Park, Kans.; the ZigBee™ standard (IEEE 802.15.4) developed by the Zigbee Alliance and or proprietary ISM band communication network. Cell phones, cell phone components and/or cell phone wireless networks may also be employed as a part of or all of the wireless communication network of the item monitoring system. Those skilled in the art recognize that different frequency ranges may be utilized as appropriate. Shelves (512) will also include a display (265). Preferably, there is one display (265) associated with each edge reader (252). The displays can be visual RFID tags or they can be plain displays that are capable of receiving and displaying information sent wirelessly or through a wired connection.

The retail network can be used in a variety of ways from monitoring inventory and shelf stocking levels to providing immediate consumer visual feedback. Using the network of FIG. 9 as an example, an RFID tagged consumer item located on a shelf is removed from the shelf by a consumer. Movement of the RFID tagged consumer item past the edge reader triggers an event that is reported to the central control station. The central control station can display and/or record the event or it can be programmed to direct a command to the reader/display unit in response to the specific reported event, such as changing the display to offer the consumer two for the price of one.

As noted above, in one embodiment, the system hardware includes a master control unit which manages zones in the retail establishment using small footprint RFID readers and antennas. The master control unit is then able to control and connect the shelf units that are strategically placed to create and control a shelf interrogation zone identified by the retail management team. The slave units are all peel and stick type Omni-ID reader antennas associated with the edge reader.

This retail network of this invention has the ability to communicate events that occur in the shelf zone to a central control station wirelessly. This station is an electronic display that allows the events to be communicated to the appropriate group of people or to the appropriate program. This station unit might include a flat screen display of fair size that can process data, and display events using a GUI interface to the user. It is a touch panel that can easily send messaging to create work orders, or tasks. The unit only communicates information and takes no action on its own. This is then what creates the last part of the system, which is the firmware, and the software applications for use in store—the Event Task Control ETC.

By using retail networks of this invention, smarter in store decisions can be made in regards to improving inventory management, sales lift and revenue, along with shrink and product movement. The roadmap to get to finalized solution may take several iterations, however the basic framework and functioning unit can be accomplished in 18 months.

Other optional features of the retail network include:

In Store Event/Task Log Display—

This is the touch screen panel that will receive information from the zoned coverage area. The zoned coverage will require event types and managed through GUI at the ETC unit. The ability then to send tasks and messaging back to equipment in store is required. The ETC unit will serve as the manual override to create the tasks required from the event log.

Integrated Display Messaging—

This is simply the work required to add the ZBD operating system "bounce" to the ETC unit. In this way an interface menu can be created to collect, filter, manage, and action the tasks and messages as required. This is can then move to messaging in store as the retailer requires Master/Slave Zone Units—

This is the firmware/hardware required to accurately connect a group of RFID devices to create an interrogation zone. The Master unit will house the reader and become the central point of contact on the retail floor. The Slave units will connect with the Master to create the zone. At first this will be done with coaxial cabling, however the goal is to move to wireless solution. This system will require diagnostics by the master to create proper zone coverage by the slave units. The slave units are to be reader antennas with edge control, and not full readers units if possible. Edge control being the comms, and filters as discussed.

Passive Sensor—

This is the commercialized passive sensor tag to include wisp technology from Intel. The unit will house the entire WISP with Omni-ID antenna, to include an external sensor.

The Factory Network

Figure 9:
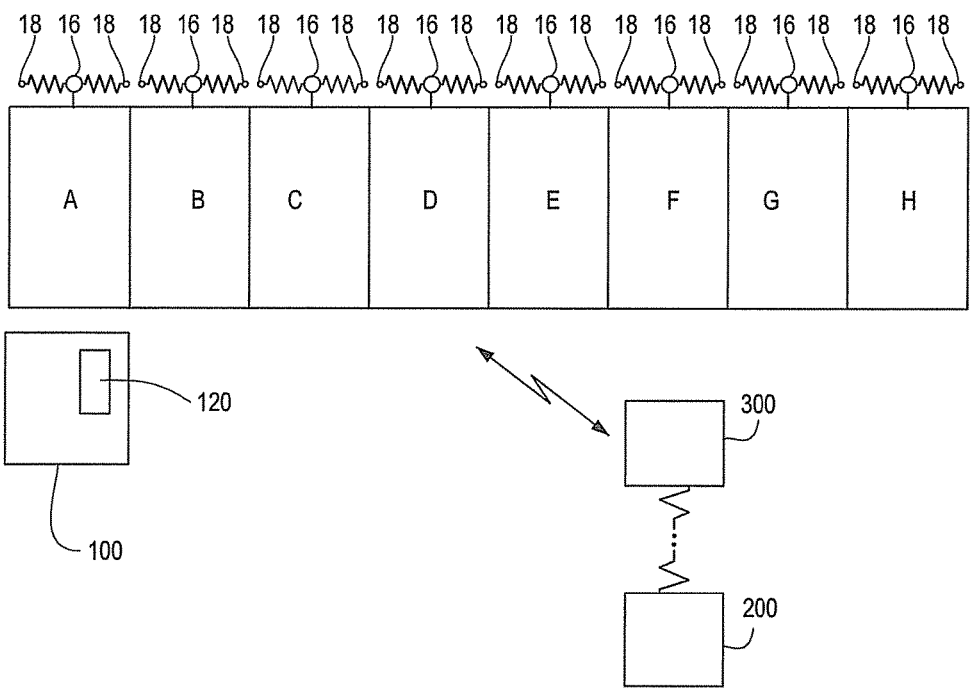
FIG. 9 is a schematic of a factory network embodiment of this invention.

A schematic of a factory network is shown in FIG. 9 which includes a moving platform or a part (100) that includes a visual RFID tag (120). As a first step, part (100) is directed to workstation A of the one or more workstations A-H. Each workstation includes a reader (16) and one more associated antennas (18). Alternatively or in addition, the workstations can include a base station reader (250) and a plurality of edge readers (252). Moreover, it is within the scope of this invention that reader (16) can be associated with both a plurality of antennas (18) and a plurality of edge readers (252).

The reader/antennas communicate—transmit information—wirelessly to wireless communication hub (300) which relays the transmitted information wirelessly or by hardwired connection to central control station (200). The central control station (200) and wireless hub (300) work together with the reader/antennas to collect data from and send information to visual tag (120) associated with part (100).

Part (100) is capable of undergoing a unique process or manufacturing step at each of workstations A-H. For example, assume part (100) is a refrigerator shell. Control station (36) sends instructions to and the reader/controller (16) programs the RFID IC with instructions building the refrigerator at each work station. When part (100) moves to a workstation A, the reader/antenna associated with workstation A will ping visual tag (120), it will learn the unique identifier of the RFID tag associated with visual tag (120) and it will notify the central control station (200) that part (100) is at workstation A. The central control station (200) will then send instructions to visual tag (120) via wireless communications hub (300) and reader/antenna (16 and 18) to update the information displayed on visual tag (120) to indicate that a door with an icemaker should be installed on the shell. Part (100) can then be moved to workstation B at which point the control station would learn that part (100) is located in workstation B at which point central control station (200) can send instructions to the visual tag (120) to update the display to indicate that no work needs to be done on the refrigerator at workstation B. Part (100) can then be moved down the manufacturing line to successive workstation and the central control station (200) will control what is displayed on the display associated with visual RFID tag (120) to provide unique visual manufacturing instructions at each work station.

The use of the visual RFID tags (120) in a manufacturing network allows for real time dynamic modification of manufacturing processes. For example, if orders come in during the manufacturing process demanding refrigerators with digital temperature controls, the control station can alter the instructions that were originally associated with part (400) in the middle of the manufacturing process so that digital controls are installed instead of the originally programmed analog controls at the appropriate work station in order to meet the requirements of the incoming orders.

The present invention has now been described with reference to several embodiments thereof. The foregoing detailed description and examples have been given for clarity of understanding only. No unnecessary limitations are to be understood therefrom. All patents and patent applications cited herein are hereby incorporated by reference. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. An edge reader network comprising:
   a plurality of edge readers, one or more of the edge readers comprising:
   an RFID tag reader including an antenna wherein the RFID tag reader is a read-only tag reader;
   a short range wireless communications device that communicates with at least one second edge reader;
   a microcontroller; and
   a power source wherein the edge reader includes a unique identifier that allows the location of the edge reader to be ascertained by a central control station;
   at least one base station reader the base station reader further comprising an RFID tag reader having an antenna, a first wireless communications device for communicating wirelessly with the one or more edge controllers and a second communications device for communicating with a central control station; and
   a plurality of items that are individually tagged with an RFID tag wherein at least a portion of the individually tagged items lie outside of the read range of the base station RFID tag reader but within the range of the RFID reader of one or more of the edge readers wherein one or more of the plurality of edge readers acquire and transmit RFID tag information of items that lie outside the read range of the base station RFID tag reader to the base station and wherein the first communications device demodulates incoming RFID tag data and transmits the demodulated RFID tag data to the second communications device.

2. The edge reader network of claim 1 wherein the edge reader wireless communications device and the base station first wireless communication device are each Zigbee communications devices.

3. The edge reader network of claim 1 wherein the edge reader RFID reader and the base station RFID reader are both UHF RFID readers.

4. The edge reader network of claim 1 wherein each of the edge readers is battery powered.

5. The edge reader network of claim 1 wherein
   wherein the at least one edge reader that lies beyond communication range of the at least one base station relays collected RFID data to the base station by wirelessly transmitting the collected RFID data to at least one second edge reader which wirelessly transmits the RFID data to the base station reader.

6. The edge reader network of claim 5 wherein each of the plurality of edge readers are self-powered.

7. The edge reader network of claim 1 wherein the microcontroller coordinates the movement of data between the RFID tag reader and the short range wireless communications device.

8. The edge reader network of claim 1 wherein the microcontroller controls the wireless transmission of data from the edge reader to the base station reader.

9. The edge reader network of claim 1 wherein the short range wireless communications device operates at a wireless communications protocol selected from Bluetooth and Zigbee.

10. The edge reader network of claim 1 wherein the short range wireless communications device is a Zigbee communications device.

11. The edge reader network of claim 1 wherein the RFID tag reader is a UHF RFID tag reader.

12. The edge reader network of claim 1 wherein the power source is an internal power source.

13. The edge reader network of claim 1 wherein the unique identifier is an IP address.

* * * * *